(12) United States Patent
Hanson Allen et al.

(10) Patent No.: US 12,465,102 B2
(45) Date of Patent: Nov. 11, 2025

(54) GARMENT WITH CONCEALING TECHNOLOGY

(71) Applicant: SPANX, LLC, Atlanta, GA (US)

(72) Inventors: Wendy Hanson Allen, Atlanta, GA (US); Deneb Torano, Atlanta, GA (US)

(73) Assignee: Spanx, LLC, Atlanta, GA (US)

( * ) Notice: Subject to any disclaimer, the term of this patent is extended or adjusted under 35 U.S.C. 154(b) by 0 days.

(21) Appl. No.: 18/804,797

(22) Filed: Aug. 14, 2024

(65) Prior Publication Data
US 2025/0057267 A1 Feb. 20, 2025

Related U.S. Application Data

(63) Continuation of application No. 17/480,764, filed on Sep. 21, 2021, now abandoned.

(51) Int. Cl.
*A41D 31/02* (2019.01)
*A41D 27/02* (2006.01)

(52) U.S. Cl.
CPC ............ *A41D 31/02* (2013.01); *A41D 27/02* (2013.01); *B32B 2307/404* (2013.01); *B32B 2437/00* (2013.01)

(58) Field of Classification Search
CPC .... A41D 31/02; A41D 27/02; A41D 2400/38; A41D 1/06; B32B 2307/404; B32B 2437/00
See application file for complete search history.

(56) References Cited

U.S. PATENT DOCUMENTS

| | | |
|---|---|---|
| 4,993,077 A | 2/1991 | Robison |
| 10,368,587 B2 | 8/2019 | Oliver |
| 10,905,172 B2 | 2/2021 | Fontaine |
| 11,425,941 B1 | 8/2022 | Connelly |
| 2004/0170813 A1 | 9/2004 | Digiacomantonio |
| 2006/0200888 A1 | 9/2006 | Hunter |
| 2009/0031470 A1 | 2/2009 | Ishikawa et al. |
| 2014/0039432 A1 | 2/2014 | Dunbar |
| 2014/0165265 A1 | 6/2014 | Tulin et al. |
| 2014/0273741 A1 | 9/2014 | Hays |
| 2014/0273743 A1 | 9/2014 | Hays |
| 2014/0317823 A1 | 10/2014 | Hanson |
| 2019/0124999 A1 | 5/2019 | Crump |
| 2019/0335825 A1 | 11/2019 | Green |
| 2022/0007747 A1 | 1/2022 | Karon |

(Continued)

FOREIGN PATENT DOCUMENTS

| | | |
|---|---|---|
| CN | 202456451 U | 10/2012 |
| CN | 107650449 A | 2/2018 |
| CN | 210415721 U | 4/2020 |

(Continued)

OTHER PUBLICATIONS

Extended European Search Report, dated Feb. 24, 2023, and issued in connection with corresponding European Application No. 22196728.4 (8 pages).

(Continued)

*Primary Examiner* — Khaled Annis
(74) *Attorney, Agent, or Firm* — Meunier Carlin & Curfman LLC

(57) ABSTRACT

A garment including a concealing material having an outer layer and an inner layer and methods of making the same.

12 Claims, 9 Drawing Sheets

(56) References Cited

U.S. PATENT DOCUMENTS

2023/0102170 A1    3/2023   Hanson
2025/0057267 A1*  2/2025   Hanson Allen ......... B32B 5/024

FOREIGN PATENT DOCUMENTS

| EP | 1074189 A2 | 2/2001 |
| JP | 3117929 U | 1/2006 |
| JP | 2011038191 A | 2/2011 |
| JP | 5156410 B2 | 3/2013 |
| JP | 5920068 B2 | 5/2016 |
| JP | 3208480 U | 1/2017 |
| JP | 3213507 U | 11/2017 |
| TW | 201326500 A | 7/2013 |
| WO | 2020091245 A1 | 5/2020 |

OTHER PUBLICATIONS

Knitting Industry, Teijin Develops New Laminated Knitted Fabric, Nov. 30, 2017, Tokyo, Japan, https://www.knittingindustry.com/teijin-develops-new-laminated-knitted-fabric/ (3 pages).

Communication Pursuant to Article 94(3) EPC received in correspopdning European Application No. 22196728.4, dated Jan. 30, 2025.

\* cited by examiner

GARMENT WITH CONCEALING TECHNOLOGY

BACKGROUND

A common issue with conventional garments is that they often do not hide a wearer's imperfections or undergarments beneath the garment. This is particularly true where the garment is a light shade, such as a pastel or white color, or a pattern thereof. In an effort to address these issues, garments have been designed with increased ply or tightness of the weave or knit of a fabric or by providing multiple layers of the same fabric. However, this does not always provide enough opacification to mask imperfections, garment construction, or undergarments, especially if the undergarments are white. Further, increasing ply or weave or knit tightness or layering the same fabric significantly increases the garment weight and causes the garments to become undesirably stiff or thick. There remains a need for garments, particularly light-weight or thin garments, that can adequately conceal a wearer's undergarments or imperfections.

BRIEF SUMMARY

Disclosed herein are garments with a concealing material, wherein the concealing material comprises an inner layer and an outer layer overlaying the inner layer, wherein at least a portion of the outer layer is white- or pastel-colored, wherein at least a portion of the inner layer has a predetermined shade of gray, and wherein the garment is configured to conceal at least a portion of an undergarment, the garment's construction, or at least a portion of a wearer's natural anatomy when in use. In some aspects, the predetermined shade on the gray scale has CIE LCh coordinates of L=64.959, C=1.4698, h=170.526, and wherein color tolerance is about 12 to 15. In some aspects, the outer layer comprises an outer material. In further aspects, the outer material may comprise a knitted or woven fabric. In some aspects, the inner layer comprises an inner material. In still further aspects, the inner layer comprises an adhesive layer. The inner material may be adhered to the outer layer with an adhesive layer. In other aspects, the inner material comprises an interior-only fiber knitted or woven onto at least a portion of an interior surface of the outer layer using a double knit or double weave configuration. In still other aspects, the inner material comprises an inner coating directly coated on the outer layer.

The garments disclosed herein have significant advantages over conventional garments in that they are thin and lightweight while still being able to adequately conceal garment construction, like pocket bags and seam allowance, and a wearer's undergarments or imperfections. Methods of making the garments with concealing material are also disclosed herein. In addition to the aspects and aspects described above, further aspects will become apparent by reference to the drawings and study of the following detailed description.

DETAILED DESCRIPTION

Figure 1:
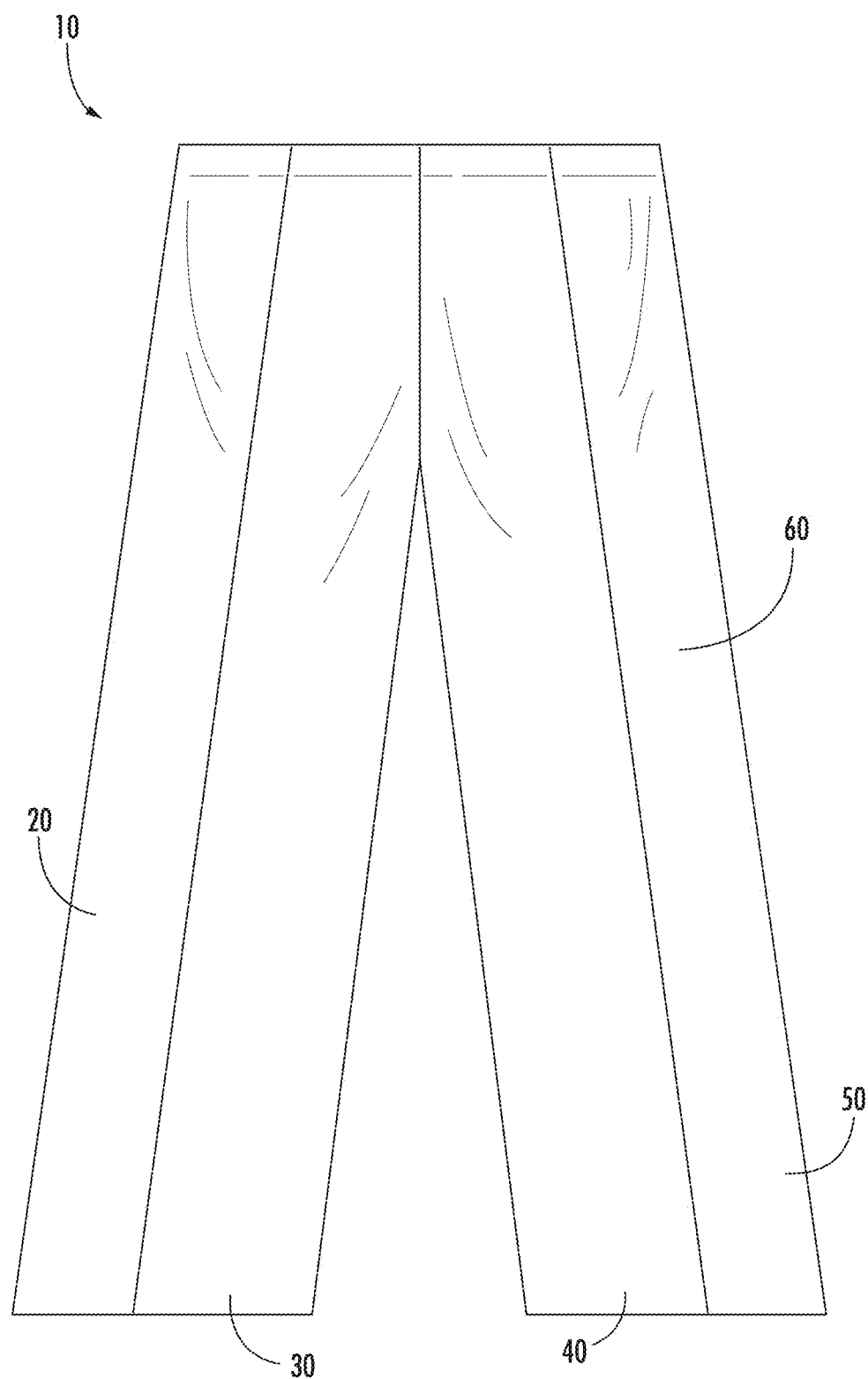
FIG. 1 illustrates a front view of an aspect of a garment with concealing technology.

This description below refers to certain aspects of the garment relative to other aspects of the garment or to the body of a wearer. As used herein, superior indicates a direction that is closer to the wearer's head. Inferior indicates a direction that is closer to the wearer's feet. Upward, upper, or uppermost indicates a superior direction, or toward a wearer's head. Downward, lower, or lowermost indicates an inferior direction, or toward a wearer's feet. The longitudinal direction refers to an axis extending between the superior and inferior edges of the garment, or between the wearer's head and feet. Lateral indicates a positioning that is closer to the sides of the wearer. Medial indicates a positioning that is farther from the sides of the wearer. The terms right and left are in reference to the wearer's body. Some of the figures can include the letters R and L as right and left directional indicators.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations), and the spatially relative descriptors used herein interpreted accordingly.

The following description of certain examples of the inventive concepts should not be used to limit the scope of the claims. Other examples, features, aspects, and advantages will become apparent to those skilled in the art from the following description. As will be realized, the device and/or methods are capable of other different and obvious aspects, all without departing from the spirit of the inventive concepts. Accordingly, the drawings and descriptions should be regarded as illustrative in nature and not restrictive. It is also to be understood that the terminology used herein is for the purpose of describing particular aspects only and is not intended to be limiting. As used in the specification and in the claims, the term "comprising" can include the aspects "consisting of" and "consisting essentially of." Additionally, the term "includes" means "comprises."

For purposes of this description, certain aspects, advantages, and novel features of the aspects of this disclosure are described herein. The described methods, systems, and apparatus should not be construed as limiting in any way. Instead, the present disclosure is directed toward all novel and nonobvious features and aspects of the various disclosed aspects, alone and in various combinations and sub-combinations with one another. The disclosed methods, systems, and apparatus are not limited to any specific aspect, feature, or combination thereof, nor do the disclosed methods, systems, and apparatus require that any one or more specific advantages be present or problems be solved.

Features, integers, characteristics, or groups described in conjunction with a particular aspect, or example of the invention are to be understood to be applicable to any other aspect, aspect or example described herein unless incompatible therewith. All of the features disclosed in this specification (including any accompanying claims, abstract, and drawings), and/or all of the steps of any method or process so disclosed, can be combined in any combination, except combinations where at least some of such features and/or steps are mutually exclusive. The invention is not restricted to the details of any foregoing aspects. The invention extends to any novel one, or any novel combination, of the features disclosed in this specification (including any accompanying claims, abstract, and drawings), or to any novel one, or any novel combination, of the steps of any method or process so disclosed.

As used in the specification and the appended claims, the singular forms "a," "an," and "the" include plural referents unless the context clearly dictates otherwise. Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. "Optional" or "optionally" means that the subsequently described event or circumstance can or cannot occur, and that the description includes instances where said event or circumstance occurs and instances where it does not.

For the terms "for example" and "such as," and grammatical equivalences thereof, the phrase "and without limitation" is understood to follow unless explicitly stated otherwise. Similarly, when values are expressed as approximations, by use of the antecedent "about," it will be understood that the particular value forms another aspect. It will be further understood that the endpoints of each of the ranges are significant both in relation to the other endpoint and independently of the other endpoint. Unless stated otherwise, the term "about" means within 5% (e.g., within 2% or 1%) of the particular value modified by the term "about."

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6 and any whole and partial increments therebetween. This applies regardless of the breadth of the range. As used herein, the terms "substantially near" or "substantially abut" refer to a disclosed component, element, member, or article being positioned within at least about 85%, at least about 90%, at least about 91%, at least about 92%, at least about 93%, at least about 94%, at least about 95%, at least about 96%, at least about 97%, at least about 98%, at least about 99%, or about 100% of a component, element, member or article that it is described in reference to.

Further, the terms "coupled" and "associated" generally mean electrically, electromagnetically, and/or physically (e.g., mechanically or chemically) coupled or linked and do not exclude the presence of intermediate elements between the coupled or associated items. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein, the term "and/or" includes any and all combinations of one or more of the associated listed items.

It will be understood that, although the terms "first," "second," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or a section. Thus, a first element, component, region, layer, or section discussed below could be termed a second element, component, region, layer, or section without departing from the teachings of exemplary aspects.

There exists a need for thin, lightweight garments that are not "see-through" on wearers. "See-through" means that imperfections of the wearer's skin, such as tattoos or cellulite, garment construction, or undergarments are visible to others through the garment, which can be undesirable or embarrassing for the wearer. Garments that have an exterior surface of a light shade, such as a pastel or white color, or a pattern thereof, are frequently see-through. Prior art has attempted to address this issue by increasing the plies or the tightness of the weave or knit of the fabric. However, this does not always provide enough opacification to address the issue; additionally, this significantly increases the fabric weight and causes the garments to become undesirably stiff or thick. In certain aspects, disclosed herein are garments comprising a concealing material designed to address the sheerness of fabrics having a light shade without significantly increasing fabric weight or thickness.

Figure 2:
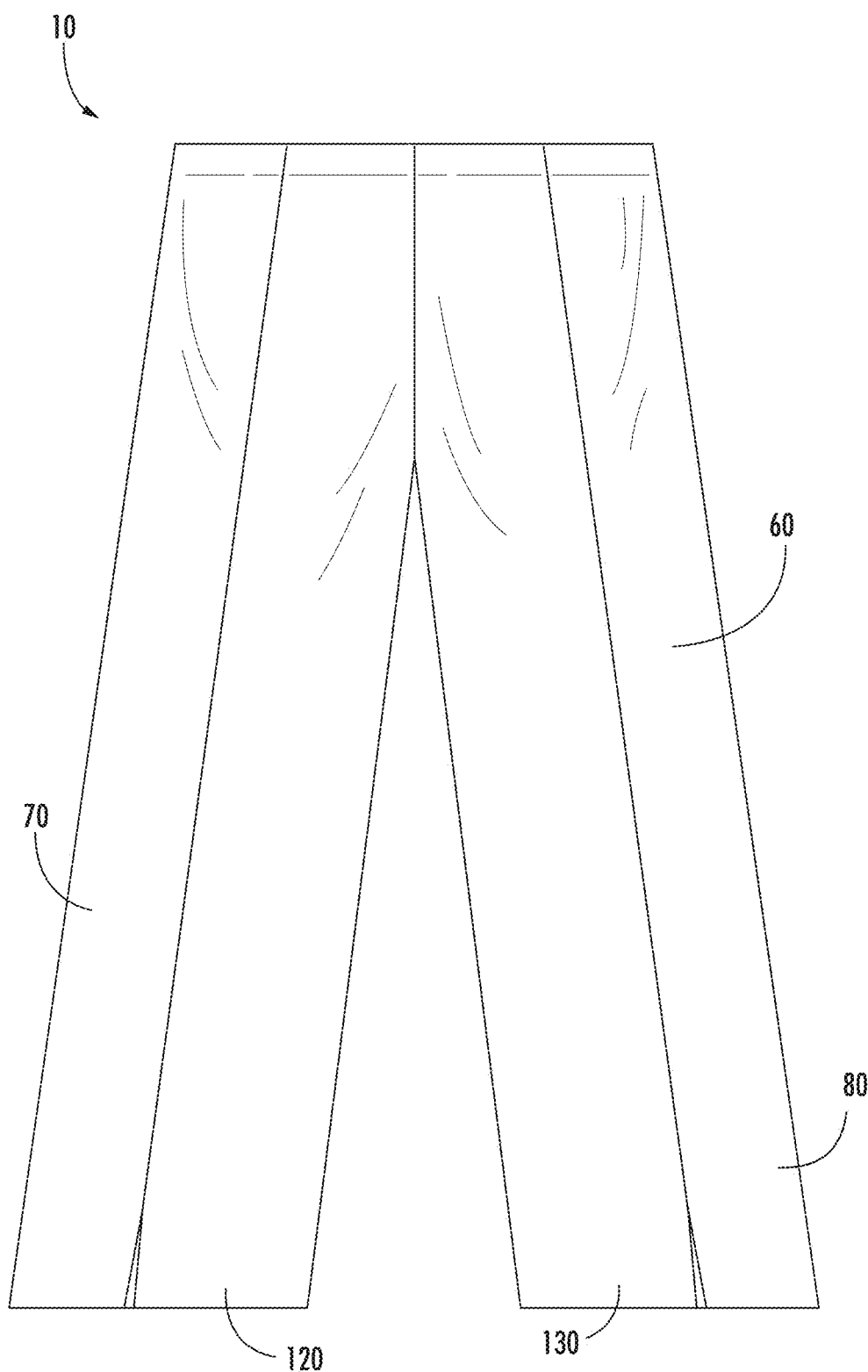
FIG. 2 illustrates a back view of the aspect of FIG. 1.
Figure 3:
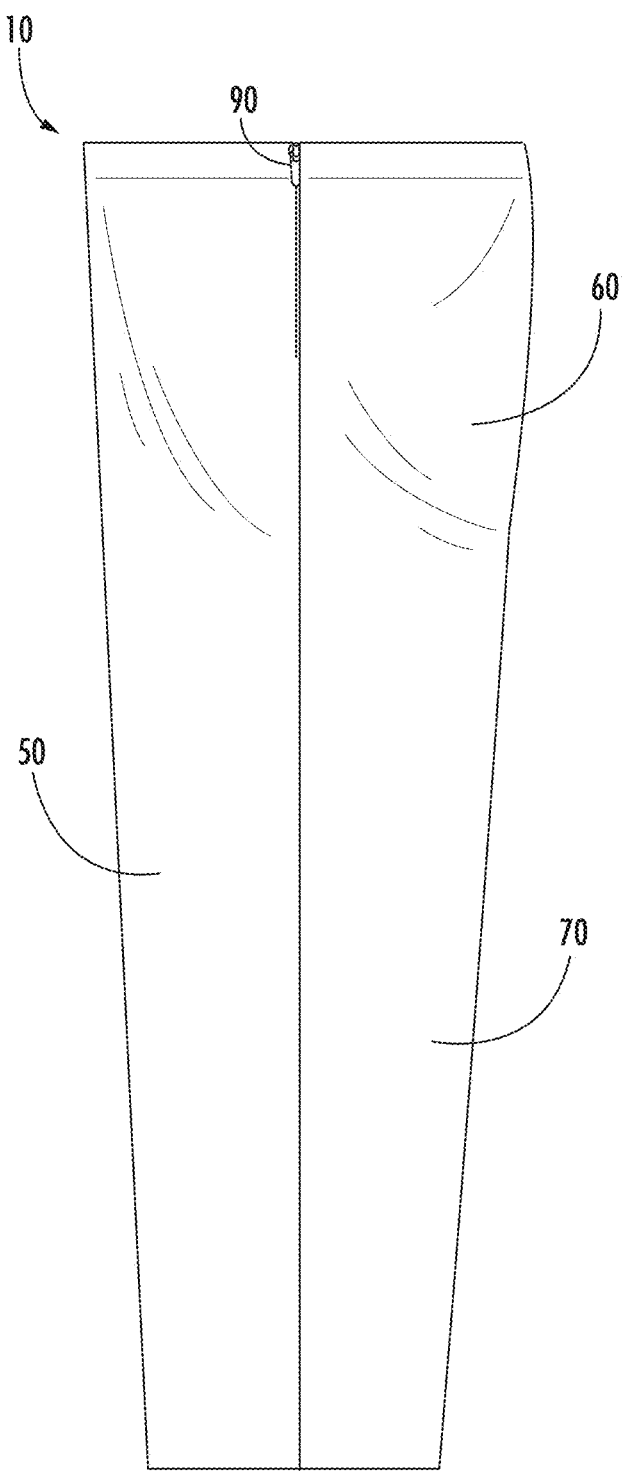
FIG. 3 illustrates a right side view of the aspect of FIG. 1.
Figure 4:
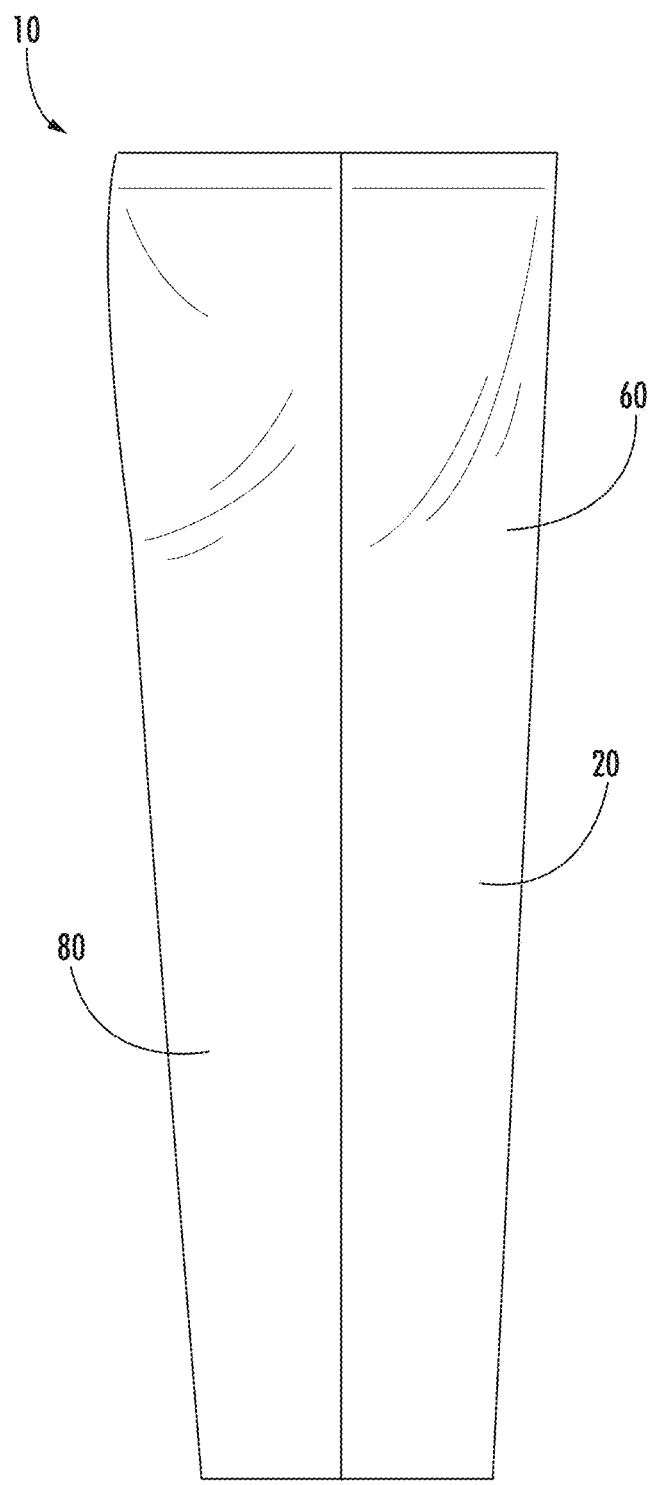
FIG. 4 illustrates a left side view of the aspect of FIG. 1.
Figure 5:
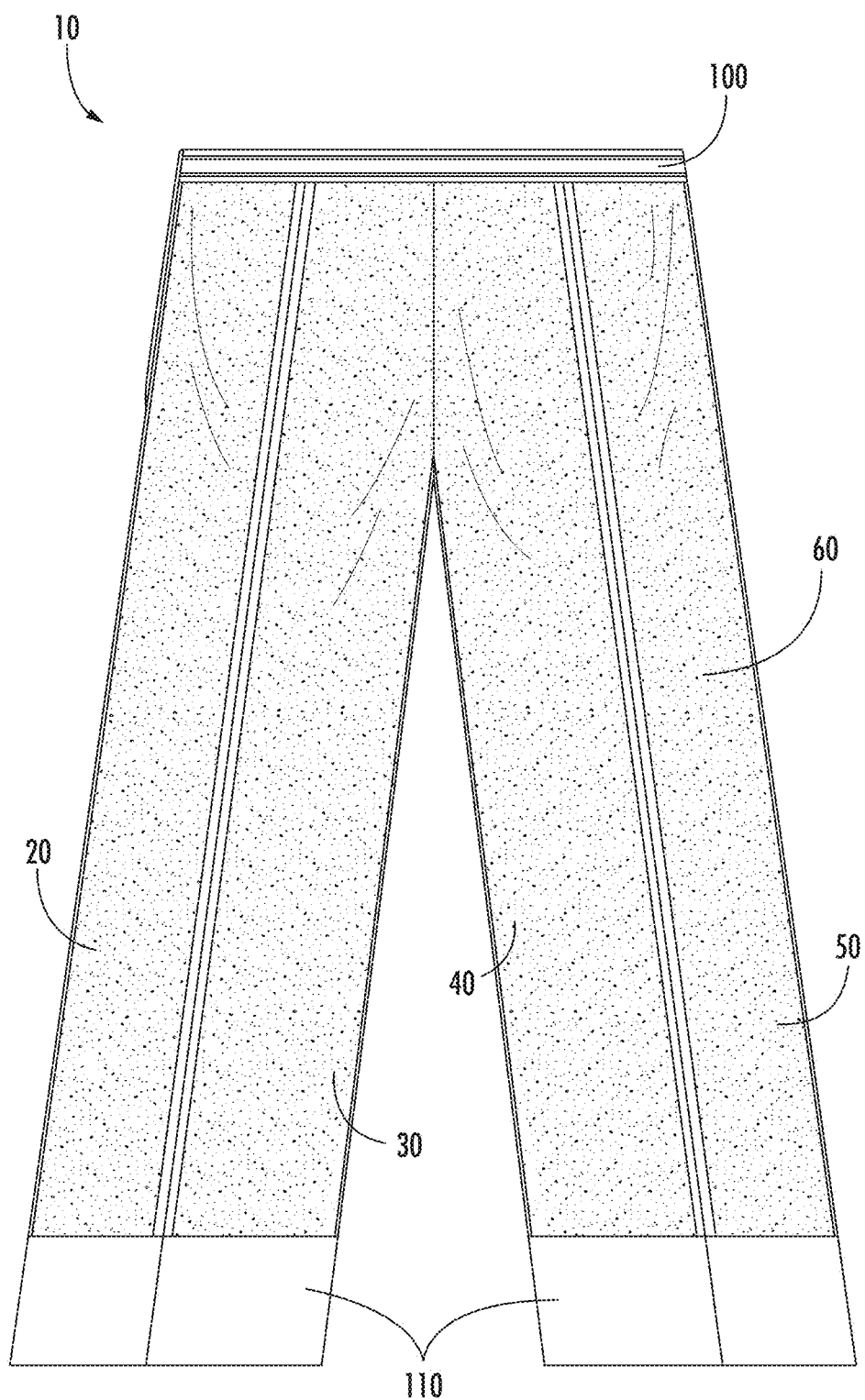
FIG. 5 illustrates an interior front view of the aspect of FIG. 1.
Figure 6:
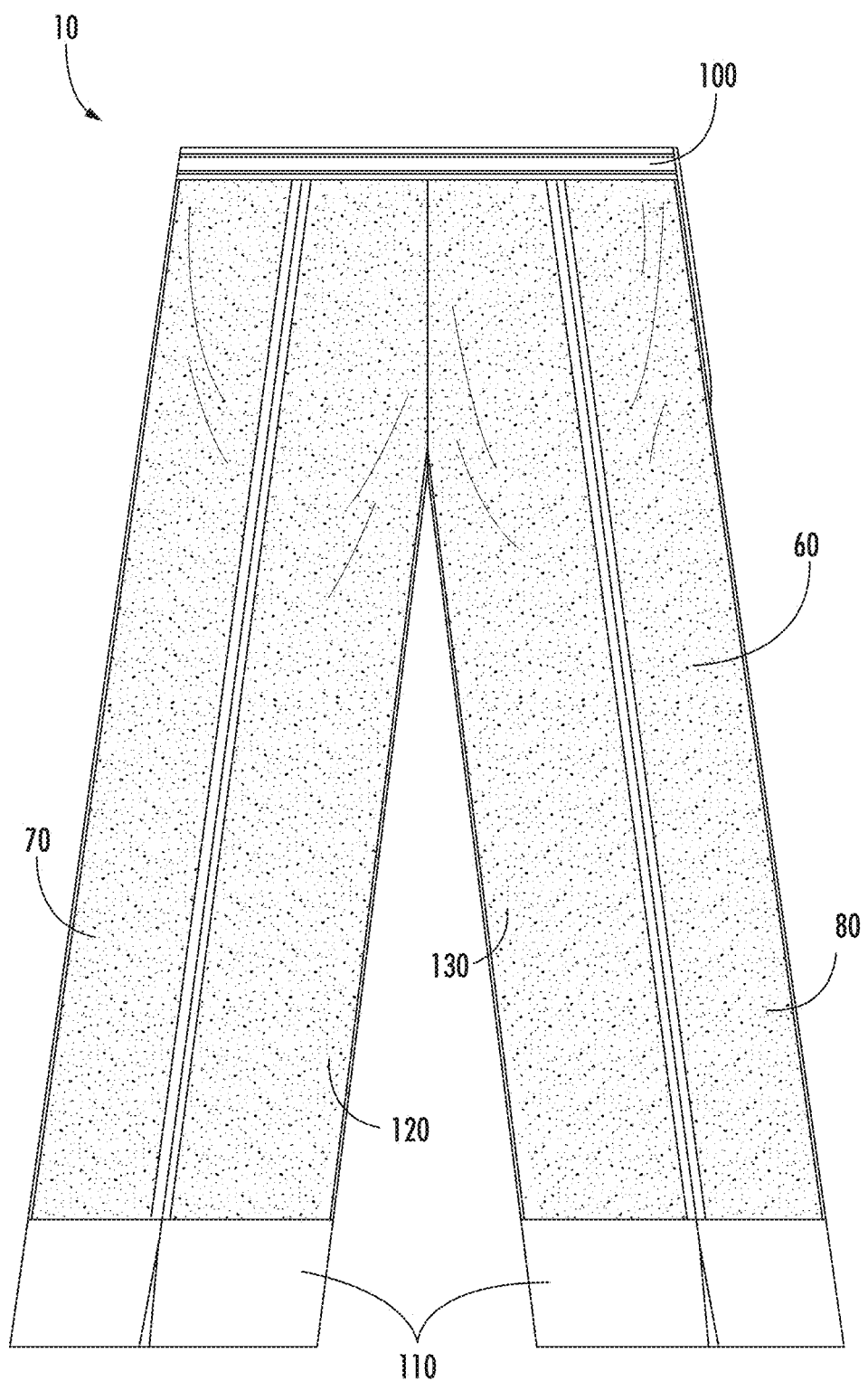
FIG. 6 illustrates an interior back view of the aspect of FIG. 1.
Figure 7:
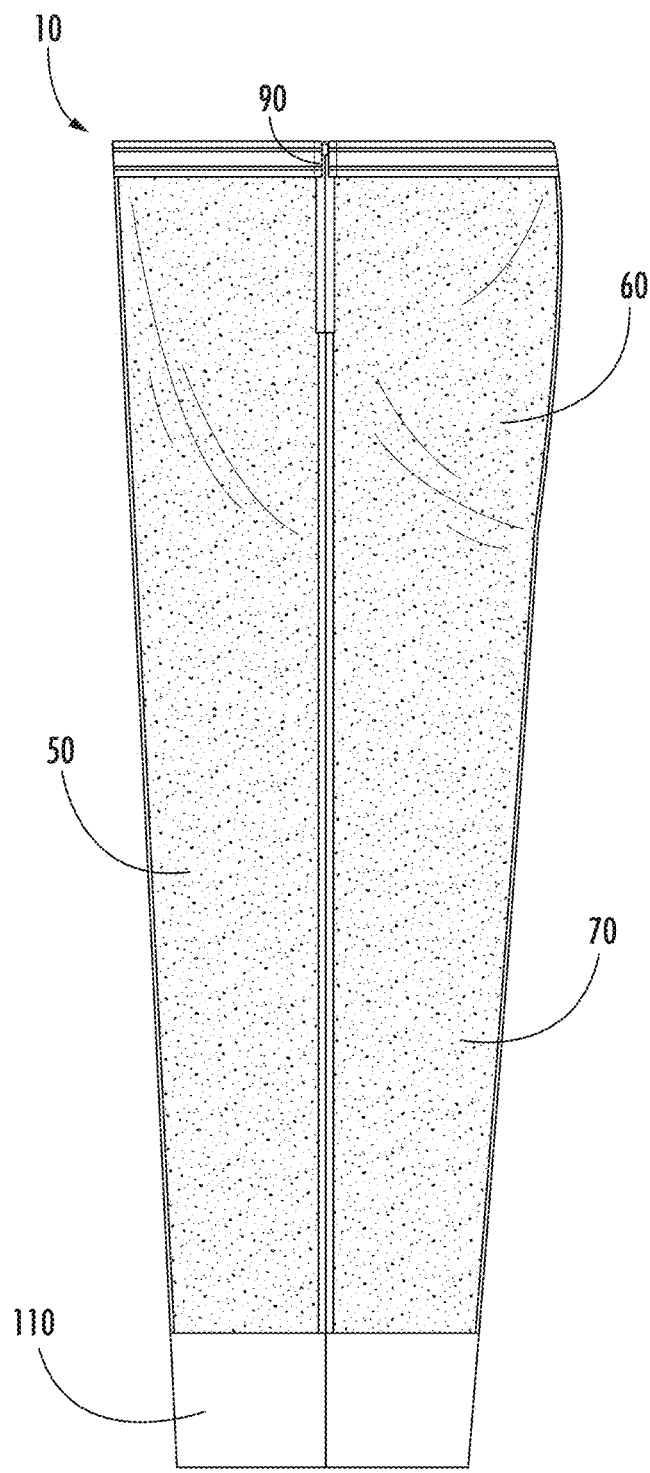
FIG. 7 illustrates an interior right-side view of the aspect of FIG. 1.
Figure 8:
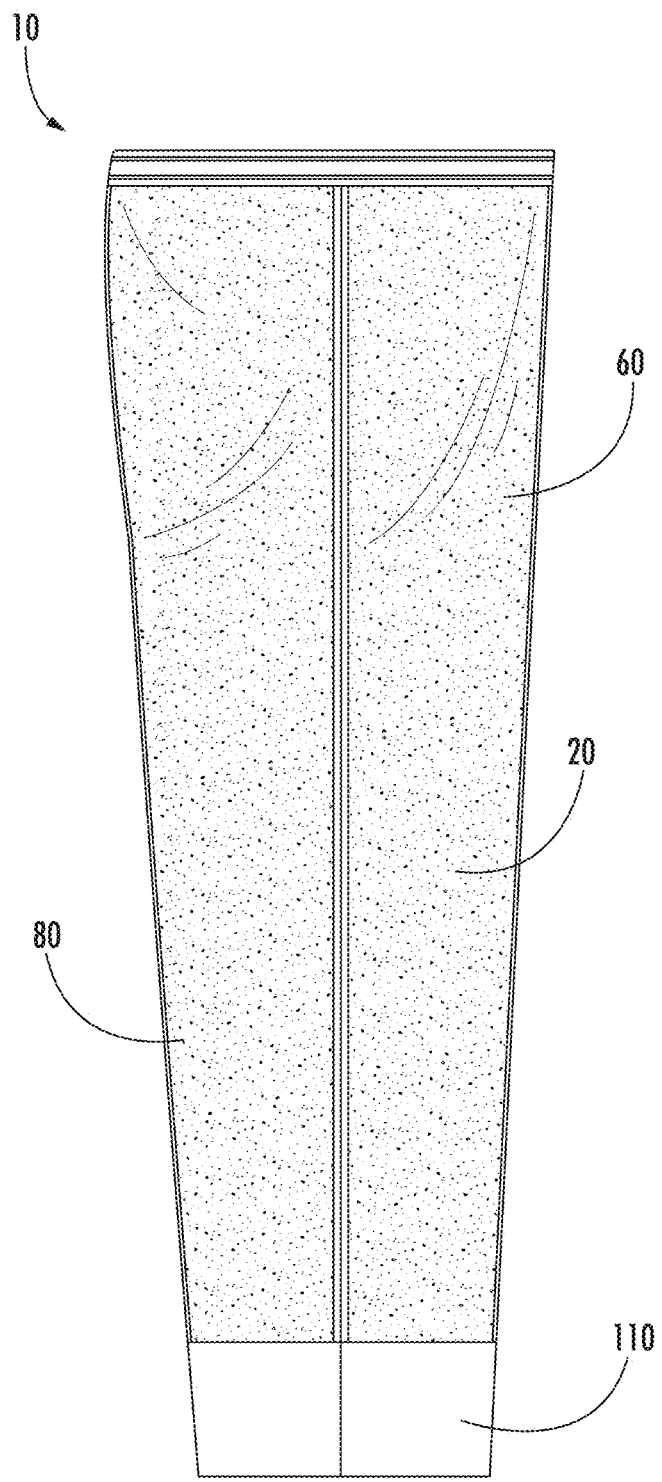
FIG. 8 illustrates an interior left-side view of the aspect of FIG. 1.
Figure 9:
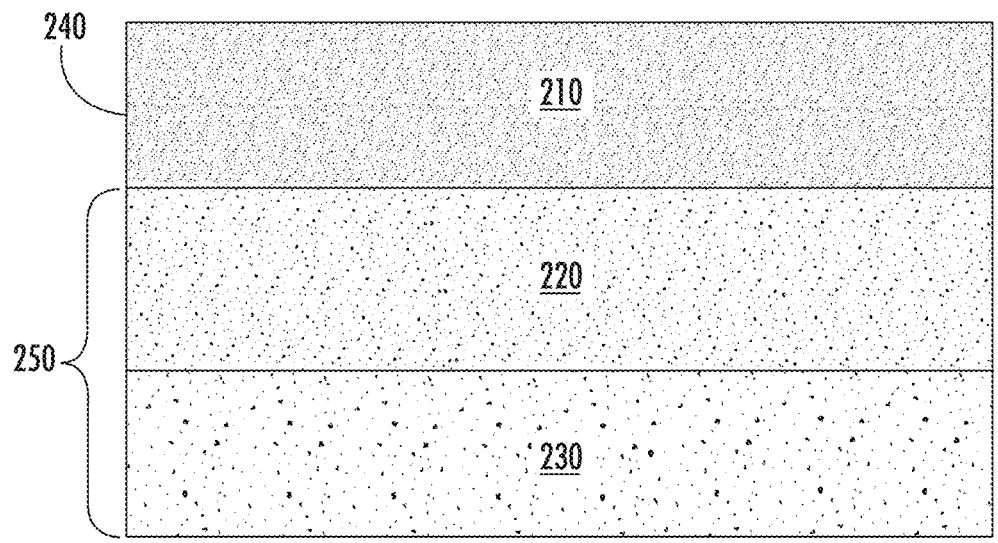
FIG. 9 illustrates a cross-sectional view of one aspect of the material of the garment of FIG. 1.
Figure 10:
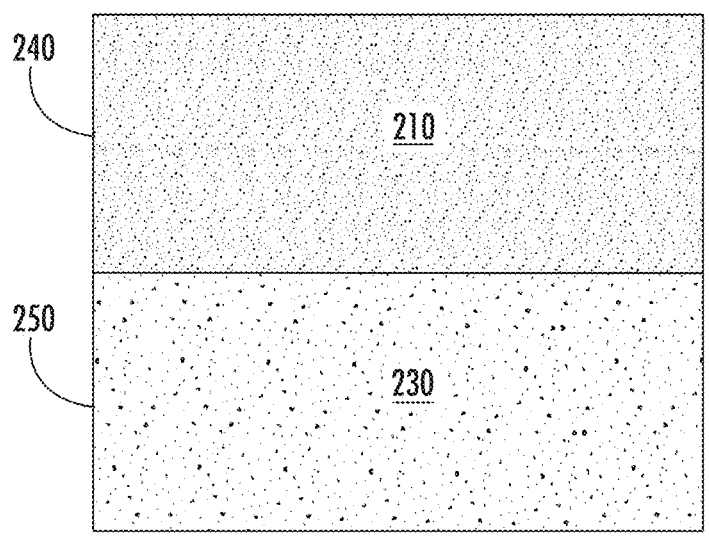
FIG. 10 illustrates a cross-sectional view of another aspect of the material of the garment of FIG. 1.

FIG. 1 shows the front side of an exemplary garment 10 as disclosed herein. FIG. 2 shows the back side of the same exemplary garment 10. FIGS. 3 and 4 show right and left sides of the garment 10, respectively. FIG. 5 shows the interior view of the front side of the garment 10. FIG. 6 shows the interior view of the back side of the same garment 10. FIGS. 7 and 8 show the interior view of the right and left sides of the garment 10, respectively. FIG. 9 shows a cross-sectional view of one aspect of the material of the garment 10 with concealing technology. FIG. 10 shows a cross-sectional view of another aspect of the material of the garment 10 with concealing technology. As shown in the accompanying drawings, the garment 10 comprises a concealing material 60. As shown in FIG. 9, some aspects of the concealing material 60 comprise an outer layer 240 and an inner layer 250, wherein the inner layer 250 further comprises an adhesive layer 220 and an inner material 230, and the outer layer 240 comprises an outer material 210. As shown in FIG. 10, other aspects of the concealing material 60 comprise an outer layer 240 and an inner layer 250, wherein the inner layer 250 comprises an inner material 230, and the outer layer 240 comprises an outer material. In some aspects, the inner material 230 is a fiber that is affixed to the outer layer 240 by a double knit or double weave configuration. In other aspects, the inner material 230 is a textile coating.

In certain aspects, the outer layer 240 is configured to cover at least a main portion of an exterior surface of the garment. In some aspects, the outer layer 240 comprises an outer material 210 that is a knitted or woven fabric. In still further aspects, the knitted or woven fabric of the outer layer 240 can comprise threads of any fiber type known in the art and applicable to the desired used. Specifically, the fiber type can comprise natural and/or synthetic fibers. Exemplary fiber types include, but are not limited to, cotton, nylon, viscose, elastane, polyester, wool, rayon, silk, linen, and hemp. At least a portion of the outer layer 240 can be white or a light shade, such as a pastel. The outer layer 240 can be any print or pattern including white or a light shade. In other aspects, the outer layer 240 has a print or pattern with white and at least one other color. The outer layer can be in the style of dressy, casual, or activewear, or any combination thereof.

As can be seen in accompanying FIGS. 5-8, the inner layer 250 is configured to cover at least a portion of an interior surface of the garment 10. In some aspects, the inner layer 250 is configured to cover the entire interior surface of the garment 10. In other aspects, the inner layer 250 is configured to cover only a portion of the interior surface of the garment 10. For example, the inner layer 250 can be configured to cover the interior of the garment 10 where undergarments can typically be visible. In an upper body garment, the inner layer 250 can be configured to cover the interior surface of the garment in the wearer's bust area. In a lower body garment, the inner layer 250 can be configured to cover the interior surface of the garment in the wearer's lower torso and rear areas. In some embodiments, the inner layer 250 is affixed to the outer layer 240 to create the concealing material that is then cut and used to assemble the garment. In other embodiments, the inner layer 250 is affixed to the outer layer 240 after the garment is completely or partially assembled.

The inner layer 250 or inner material 230 can be a predetermined shade on the gray scale. In some aspects, the predetermined shade on the gray scale has CIE LCh coordinates of L=64.959, C=1.4698, and h=170.526, wherein the color tolerance is about 12 to 15. In some aspects, the color tolerance is 15. In other aspects, color tolerance is 12. The inner layer 250 or inner material 230, and particularly its gray shade, provides opacity to the garment while in use so that the garment is not see-through. The inner layer 250 or inner material 230 masks cellulite, tattoos, or other markings or blemishes of the skin. Additionally, the inner layer 250 or inner material 230 masks undergarment color or the garment's construction, including seam allowance or pocket bags, for example.

In certain aspects, the inner material 230 comprises a knitted or woven fabric. The knitted or woven fabric can comprise threads of any fiber type known in the art that are suitable for the desired purpose. In some aspects, the fiber type can comprise natural and/or synthetic fibers. Exemplary fiber types include, but are not limited to, cotton, nylon, viscose, elastane, polyester, wool, rayon, silk, linen, and hemp. The knitted or woven fabric can comprise the same or different threads as the threads of the knitted or woven fabric of the outer material 210 of the outer layer 240. Additionally, the inner material 230 can be configured to be lightweight to provide for comfortability, style, and breathability. For example, the inner material 230 may be a lightweight fabric of 30 to 150 GSM, 30 to 120 GSM, 30 to 100 GSM, 30 to 80 GSM, or 30 to 50 GSM. In some aspects, the inner material 230 is of a lighter weight than the outer material 210. For example, the inner material 230 may weigh 10%, 20%, 30%, 40%, or 50% less than the outer material 210. Either the threads of the knitted or woven fabric of the inner material 230, or the knitted or woven fabric of the inner material 230 itself can be dyed to reach the predetermined shade on the gray scale prior to assembly of the garment.

In still further aspects and as shown in FIG. 9, the concealing material 60 comprises an adhesive layer 220 positioned between the outer and inner layers 240, 250. The adhesive layer 220 affixes at least a portion of an interior surface of the outer material 240 to at least a portion of an exterior surface of the inner material 230. In some aspects, the adhesive layer 220 affixes the entire interior surface of the outer material 210 to the entire exterior surface of the inner material 230. In some embodiments, the inner material 230 is affixed to at least a portion of the outer material 210 via the adhesive layer 220 to create the concealing material 60 prior to cut and assembly of the garment 10. In other embodiments, the inner material 230 is affixed to at least a portion of the outer material 210 via the adhesive layer 220 after the garment 10 is completely or partially assembled. The adhesive layer 220 prevents the inner material 230 and outer material 210 from separating or bunching separately, and thus it helps to create the outward appearance of a smooth garment 10. The adhesive layer 220 can comprise any adhesive capable of unreleasably adhering to a garment. Persons of ordinary skill in the art would readily recognize commercially available adhesives suitable for use in the garments disclosed herein. The adhesive layer 220 can comprise a pressure-sensitive adhesive, glue, or hot-melt adhesive. Exemplary adhesives that can be suitable for this application include, for instance, those disclosed in U.S. Pat. No. 6,414,073, the content of which is incorporated herein in its all entirety. In some aspects, the adhesive can comprise a rubber, standard acrylic, modified acrylic, silicone, or combination thereof. Yet in other aspects, the adhesive can be a polyamide, polyurethane, or thermoplastic polyurethane (TPU) adhesive or glue, or a combination thereof.

In other aspects and as shown in FIG. 10, the concealing material 60 comprises an outer layer 240 and an inner layer 250 with no adhesive layer. In some aspects, the inner layer 250 comprises an inner material 230. In further aspects, the inner layer 250 or inner material 230 is a predetermined shade on the gray scale. The predetermined shade on the gray scale has CIE LCh coordinates of L=64.959, C=1.4698, and h=170.526, wherein the color tolerance is about 12 to 15. In some aspects, the color tolerance is 15. In other aspects, color tolerance is 12. In some aspects, the inner material 230 is an interior-only fiber that is knitted or woven onto the outer layer 240 using a double knit or double weave configuration. In other aspects, the inner material 230 is an inner coating.

The inner material 230 can be configured to cover at least a portion of an interior surface of the outer layer 240. In some aspects, the inner material 230 is configured to cover the entire interior surface of the outer layer 240. In other aspects, the inner material 230 is configured to cover only a portion of the interior surface of the outer layer 240. For example, inner material 230 can be configured to cover the portion of the interior surface of the outer layer 240 where undergarments can typically be visible. In some embodiments, the inner coating of the inner material 230 is directly coated onto the knitted or woven fabric of the outer layer 240 prior to cutting of the concealing material or assembly of the garment 10. In other embodiments, the inner coating of the inner material 230 is directly coated onto at least a portion of the interior surface of the outer layer 240 after the garment is completely or partially assembled. In an upper body garment, the inner layer 250 can be configured to cover the interior of the outer layer 240 in the wearer's bust area. In a lower body garment, the inner layer 250 can be configured to cover the interior of the outer layer 240 in the wearer's lower torso area. The inner coating can comprise a textile coating composition. Persons of ordinary skill in the art would readily recognize commercially available textile coating compositions suitable for use in the garments disclosed herein. In some aspects, the textile coating composition can comprise an aqueous adhesive solution. The textile coating composition can comprise polyvinyl acetate, ethylene vinyl acetate, polyvinyl alcohol, polyvinyl chloride, latex, styrene butadiene, acrylic, polyethersulfone, polyvinyl alcohol, styrene butadiene, polyurethane, thermoplastic polyurethane, or a combination thereof.

FIGS. 1-8 depict a garment 10 disclosed herein as a pair of pants. However, in order to achieve the benefits disclosed herein, the concealing technology can be applied to a variety of garments, including but not limited to, pants, shorts, skirts, shirts, tanks, camisoles, dresses, jackets, overalls, underwear, and brassiere. The depicted exemplary and unlimiting aspect of the garment 10 comprises a left side section and a right side section, forming left and right leg and left and right lower body torso spaces, respectively. The left and right side sections are affixed along a seam at the center of the garment configured to extend from a superior edge of a front side of the garment between the wearer's legs to a superior edge of a rear side of the garment. In some aspects, the garment further comprises a waistband 100 positioned circumferentially along a superior edge of an interior surface of the garment 10. A portion of each of the left and right side sections circumferentially folds upward and inward onto the inner surface of the left and right side sections, respectively. An upward and inward folded portion of a predetermined length is thereby formed for each of the left and right side sections. Thus, in some aspects, the bottom edge of the left and right side sections is each defined by a fold crease or a cuff 110.

Each of the left and right side sections can further comprise one or more panels. In some aspects, each leg section comprises four panels: a first rear panel 120, 130, a second rear panel 70, 80, a first front panel 30, 40, and a second front panel 20, 50. The first rear panels 120, 130 are configured to cover at least a portion of medial areas of the rear of the wearer's legs to the wearer's waist, and the second rear panels 70, 80 are configured to cover at least a portion of a lateral areas of the rear of the wearer's legs to the wearer's waist. The first front panels 30, 40 are configured to cover at least a portion of medial areas of the front of the wearer's leg to the wearer's waist, and the second front panels 20, 50 are configured to cover at least a portion of lateral areas of the front of the wearer's legs to the wearer's waist. At least a portion of a first edge of a first rear panel 120, 130 is affixed to at least a portion of a first edge of a second rear panel 70, 80 by a seam. At least a portion of a second edge of a second rear panel 70, 80 is affixed to at least a portion of a first edge of a second front panel 20, 50 by a seam. At least a portion of a second edge of a second front panel 20, 50 is affixed to at least a portion of a first edge of a first front panel 30, 40 by a seam. A portion of a second edge of a first rear panel 120, 130 is affixed to a portion of a second edge of a first front panel 30, 40 via a continuous seam extending from an inferior edge of the right or left side section to the wearer's crotch area.

In some aspects, the garment 10 can comprise at least one fastener 90 for the wearer's convenience in putting on or removing the garment 10. The fastener(s) 90 can be any conventional fastener, or combination thereof, known in the art, such as a zipper, button, toggle, stud, snap, popper, eyelet, buckle, hook and loop, hook and eye, magnet, frog, grommet, brooch, bucket loop, safety pin, laces, and fabric tie. The fastener(s) 90 can be configured to open or release in a longitudinal direction from a superior or inferior edge of the garment 10. The fastener(s) 90 can be positioned anywhere on the garment 10. In some aspects, the fastener(s) 90 can be placed at the most medial or lateral locations of the garment 10. In some aspects where the garment is a pair of pants, shorts, underwear, or a skirt, the fastener(s) 90 can be positioned anywhere along a waist-encircling portion of the garment 10. In further aspects, the fastener(s) 90 can be positioned to partially or completely open a waistband 100 for easier removal of the garment 10. In some aspects where the garment is a shirt, tank, camisole, dress, jacket, overalls, or a brassiere, the fastener(s) 90 can be positioned anywhere along a torso-encircling portion of the garment. In further aspects, the fastener(s) 90 can be positioned to partially or completely open a torso-encircling band, overall shoulder straps, or a front or back area of the garment at a medial location for easier removal of the garment.

Methods of making a garment are also disclosed herein. In some aspects, the method of making the depicted aspect of the garment 10 comprises providing a concealing material 60. Providing a concealing material 60 can comprise the use of various techniques. The concealing material 60 can be constructed via lamination, fusing, or coating. Persons of ordinary skill in the art would readily recognize commercially available lamination, fusing, and textile coating techniques suitable for use in making the garments disclosed herein. Exemplary coating techniques that can be suitable for this application include, for instance, screen printing, pigment printing, digital printing, 3D printing, direct coating, spray coating, extrusion coating, or foamed coating.

In one aspect, the concealing material 60 is constructed by providing an outer layer 240 and an inner material 230. The inner material 230 is adhered to at least a portion of the outer layer 240 using an adhesive layer 220 positioned between the inner material 230 and outer layer 240. Specifically, at least a portion of an exterior surface of the inner material 230 can be laminated or fused to at least a portion of an interior surface of the outer layer 240. In another aspect, the concealing material 60 is constructed by providing an outer layer 240 and directly applying an inner material 230 comprising a coating to at least a portion of an interior surface of the outer layer 240 via a conventional textile printing or coating technique as disclosed herein. In still another aspect, the concealing material 60 is constructed by providing an outer layer 240 and affixing an inner material 230 comprising an interior-only fiber that is knitted or woven onto at least a portion of an interior surface of the outer layer 240 via a double knit or double weave configuration.

The method of making the aspect of the garment 10 depicted in the figures further comprises cutting the concealing material 60 into a left side section and a right side section, forming a left leg and lower torso space and a right leg and lower torso space. The method further comprises sewing the left and right side sections along a seam at a portion of the center of the garment, configured to extend from a superior edge of a front side of the garment 10, between the wearer's legs, and to a superior edge of a rear side of the garment 10. The method further comprises unreleasably affixing a waistband 100 circumferentially along a superior edge of an interior surface of the garment 10. The method can further comprise circumferentially folding, and affixing via a seam, a portion of each of the left and right side sections upward and inward onto the inner surface of the left and right side sections, respectively.

Forming the left and right side sections can further comprise forming one or more panels. In some aspects, forming either the left or right side section comprises forming four panels: a first rear panel 120, 130, a second rear panel 70, 80, a first front panel 30, 40, and a second front panel 20, 50. At least a portion of a first edge of a first rear panel 120, 130 is affixed to at least a portion of a first edge of a second rear panel 70, 80 by a seam. At least a portion of a second edge of a second rear panel 70, 80 is affixed to at least a portion of a first edge of a second front panel 20, 50 by a seam. At least a portion of a second edge of a second front panel 20, 50 is affixed to at least a portion of a first edge of a first front panel 30, 40 by a seam. A portion of a second edge of a first rear panel 120, 130 is affixed to a portion of a second edge of a first front panel 30, 40 via a continuous seam extending from an inferior edge of the right or left side section to the wearer's crotch area. The method of making the garment 10 depicted herein can further comprise providing a fastener 90 configured to open anywhere along the wearer's waistband 100.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

The invention claimed is:

1. A garment comprising a concealing material, wherein the concealing material comprises an inner layer and an outer layer overlaying the inner layer,
    wherein at least a portion of the outer layer is white- or pastel-colored;
    wherein at least a portion of the inner layer has a predetermined shade of gray;
    wherein the garment is configured to conceal at least a portion of an undergarment, the garment's construction, or at least a portion of a wearer's natural anatomy when in use; and
    wherein the predetermined shade on the gray scale has CIE LCh coordinates of L=64.959, C=1.4698, and h=170.526, and wherein color tolerance is 15.

2. The garment of claim 1, wherein the outer layer comprises a knitted or woven fabric.

3. The garment of claim 2, wherein the inner layer further comprises an inner material and the inner material is adhered to the outer layer with an adhesive layer.

4. The garment of claim 3, wherein the inner material comprises a knitted or woven fabric that is the same as or different from the knitted or woven fabric of the outer layer.

5. The garment of claim 3, wherein the adhesive layer comprises a pressure-sensitive adhesive, a glue, or a hot-melt adhesive.

6. The garment of claim 5, wherein the adhesive layer comprises a rubber, standard acrylic, modified acrylic, silicone, polyamide, polyurethane, thermoplastic polyurethane, or combination thereof.

7. The garment of claim 4, wherein the garment is a lower body garment comprising a left side section and a right side section, wherein the left and right side sections form a left leg and lower torso space and right leg and lower torso space, respectively, and wherein at least a portion of the left and right side sections comprise the concealing material.

8. The garment of claim 7, wherein each of the left and right side sections further comprise a first rear panel, a second rear panel, a first front panel, and a second front panel;
    wherein the first and second rear panels of the left and right sides are configured to cover the rear side of the wearer; and
    wherein the first and second front panels of the left and right sides are configured to cover the front side of the wearer.

9. The garment of claim 8, wherein at least a portion of a first edge of the first rear panel is affixed to at least a portion of a first edge of the second rear panel by a first seam;
    at least a portion of a second edge of the second rear panel is affixed to at least a portion of a first edge of the second front panel by a second seam;
    at least a portion of a second edge of the second front panel is affixed to at least a portion of a first edge of the first front panel by a third seam;
    a portion of a second edge of the first rear panel is affixed to a portion of a second edge of the first front panel by a fourth seam;
    remaining portions of the second edges of the first rear panels are affixed by a fifth seam; and
    remaining portions of the second edges of the first front panels are affixed by a sixth seam.

10. The garment of claim 2, wherein the inner layer comprises an interior-only fiber knitted or woven onto at least a portion of an interior surface of the outer layer using a double knit or double weave configuration.

11. The garment of claim 2, wherein the inner layer comprises an inner coating directly coated on the outer layer.

12. The garment of claim 11, wherein the inner coating comprises one or more of polyvinyl acetate, ethylene vinyl acetate, polyvinyl alcohol, polyvinyl chloride, latex, styrene butadiene, acrylic, polyethersulfone, polyvinyl alcohol, styrene butadiene, or a combination thereof.

* * * * *